US008882577B2

(12) United States Patent
Kim

(10) Patent No.: US 8,882,577 B2
(45) **Date of Patent: *Nov. 11, 2014**

(54) GAMING SYSTEM AND METHOD OF GAMING

(75) Inventor: Hyong Joo Kim, Meadowbank (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 353 days.

This patent is subject to a terminal disclaimer.

(21) Appl. No.: 13/239,025

(22) Filed: Sep. 21, 2011

(65) Prior Publication Data

US 2012/0009989 A1 Jan. 12, 2012

Related U.S. Application Data

(63) Continuation of application No. 12/331,219, filed on Dec. 9, 2008, now Pat. No. 8,047,911.

(30) Foreign Application Priority Data

Dec. 10, 2007 (AU) ................................ 2007906703

(51) Int. Cl.
*A63F 13/10* (2006.01)
*G07F 17/32* (2006.01)
*G07F 17/34* (2006.01)

(52) U.S. Cl.
CPC ............ *G07F 17/3262* (2013.01); *G07F 17/34* (2013.01)
USPC ........................................................... 463/20

(58) Field of Classification Search
USPC ........................................................... 463/20
See application file for complete search history.

(56) References Cited

U.S. PATENT DOCUMENTS

| | | | |
|---|---|---|---|
| 2005/0124405 | A1 | 6/2005 | Nordman |
| 2005/0187007 | A1 | 8/2005 | Kuroiwa |
| 2005/0227755 | A1 | 10/2005 | Nordman |
| 2005/0239532 | A1 | 10/2005 | Inamura |
| 2006/0030390 | A1 | 2/2006 | Okada |
| 2006/0063584 | A1 | 3/2006 | Brill et al. |
| 2006/0073872 | A1 | 4/2006 | B-Jensen et al. |
| 2006/0178200 | A1 | 8/2006 | Shiraishi |
| 2006/0178207 | A1 | 8/2006 | Bennett |
| 2007/0191093 | A1 | 8/2007 | Bennett |
| 2009/0233683 | A1 | 9/2009 | Kim |

FOREIGN PATENT DOCUMENTS

| | | |
|---|---|---|
| CA | 2514156 | 1/2007 |
| EP | 1635306 | 3/2006 |
| GB | 2421624 | 6/2006 |
| GB | 2429320 | 2/2007 |
| JP | 2000210409 | 8/2000 |

*Primary Examiner* — George Fourson, III

(74) *Attorney, Agent, or Firm* — Hanley, Flight and Zimmerman, LLC

(57) ABSTRACT

A method of gaming comprises a first step of selecting symbols appearing in a game event. The selected symbols are stored in a symbol store arranged to store a plurality of symbols. The symbol store is arranged such that, once a maximum number of symbols is reached, storage of a further symbol in the symbol store results in the removal of a stored symbol from the symbol store in accordance with a removal rule. A final step involves determining whether the stored symbols meet an award criterion.

25 Claims, 7 Drawing Sheets

GAMING SYSTEM AND METHOD OF GAMING

CROSS-REFERENCE TO RELATED APPLICATIONS

The present application claims the benefit of priority as a continuation of U.S. patent application Ser. No. 12/331,219, filed on Dec. 9, 2008, entitled "A GAMING SYSTEM AND A METHOD OF GAMING", and to Australian Provisional Patent Application No. 2007906703, filed on Dec. 10, 2007, entitled "A GAMING SYSTEM AND A METHOD OF GAMING", each of which is herein incorporated by reference in its entirety.

FIELD OF THE INVENTION

The present invention relates to a gaming system and a method of gaming, and particularly, but not exclusively, to a gaming system and method of gaming in which bonus prizes may be awarded.

BACKGROUND OF THE INVENTION

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a video display. Win outcomes can occur based on symbols appearing in one or more horizontal lines, diagonal lines, or any other predetermined way.

While such gaming systems provide a level of enjoyment to the player, the need exists for alternative gaming systems in order to maintain or increase player enjoyment.

SUMMARY OF THE INVENTION

In accordance with a first aspect, the present invention provides a method of gaming, including:

- selecting symbols appearing in a game event;
- storing the selected symbols in a symbol store arranged to store a plurality of symbols, the symbol store arranged such that once a maximum number of symbols is reached, storage of a further symbol in the symbol store results in the removal of a stored symbol from the symbol store in accordance with a removal rule; and
- determining whether the stored symbols meet an award criterion.

In an embodiment the symbol store is a First-In-First-Out (FIFO) symbol stack and the removal rule is that the first symbol added to the symbol stack is the first removed.

In an embodiment the symbols are selected at random from at least one of a base game and feature game. In an embodiment at least one symbol is selected from each game of the base game and/or feature game.

In an embodiment the symbols are stored in the same order as which they are selected.

In an embodiment the award criterion is that a particular combination of symbols appears in the symbol store. In an embodiment bonus credits and/or additional games are awarded responsive to the award criterion being met.

In an embodiment the method includes the further step of waiting until the maximum number of symbols has been reached before determining whether the award criterion has been met.

In an embodiment the method includes the further step of displaying the symbol store in association with the base game and/or feature game.

In an embodiment the symbols are selected from a plurality of symbols utilised in the game event for evaluating a winning outcome. For example, the game event may be a spinning reel game and the symbols are selected from stop positions provided by the reel game.

In accordance with a second aspect, the invention provides a game controller including:

- a symbol selector module arranged to select symbols appearing in a game event;
- a symbol store arranged to store the selected symbols, the symbol store being arranged such that once a maximum number of symbols is reached, storage of a further symbol results in the removal of a stored symbol in accordance with a removal rule; and
- a determination module arranged to determine whether the stored symbols meet an award criterion.

In an embodiment the symbol store is a First-In-First-Out (FIFO) symbol stack and the removal rule is that the first symbol added to the symbol stack is the first removed.

In an embodiment the symbols are selected at random from at least one of a base game and feature game. In an embodiment at least one symbol is selected from each game of the base game and/or feature game.

In an embodiment, the game controller further includes an award module arranged to award a prize when the award criterion has been met.

In an embodiment the award module is arranged to award bonus credits and/or additional games responsive to the award criterion being met.

In an embodiment the award criterion is that a particular combination of symbols appears in the symbol store.

In an embodiment the determination module is arranged to wait until the maximum number of symbols has been reached before making the determination.

In an embodiment the game controller further includes a display module arranged to display the symbol store in association with the base game and/or feature game.

In an embodiment the game controller is constituted by a processor executing program code stored in a memory.

According to a third aspect, the invention provides a gaming system including:

- a game controller in accordance with the second aspect; and
- a display arranged to display the symbol store.

According to a fourth aspect, the present invention provides a controller for a gaming system including a plurality of gaming machines operable to participate in a shared game event, the controller including:

- a symbol store arranged to store a plurality of symbols, the symbol store arranged such that once a maximum number of symbols is reached, storage of a further symbol results in a removal of a storage symbol in accordance with the removable symbol;
- a symbol selector module arranged to select symbols resulting from play of the shared game event and to store the selected symbols in the symbol store; and
- a determination module arranged to determine whether the stored symbols meet an award criterion.

In an embodiment the symbol store is a First-In-First-Out (FIFO) symbol stack and the removal rule is that the first symbol added to the symbol stack is the first removed.

In an embodiment the shared game event includes displaying a separate game on a display of each of the participating gaming machines and wherein the symbols are selected from the separate games. In an embodiment the symbols are selected at random from separate games. In an alternative embodiment only designated symbols appearing in the separate games are selected by the game controller.

In an embodiment the gaming system is arranged to conduct the shared game event in response to a trigger event occurring in relation to play of a game on one of the gaming machines.

In an embodiment the controller further includes an award module arranged to award a prize to at least one of the plurality of gaming devices when the award criterion has been met, according to a distribution rule. In an embodiment the distribution rule specifies a proportion of a total award to pay to gaming machines which contributed symbols toward the winning symbol combination.

According to a fifth aspect, the present invention provides a method of conducting a shared game event including two or more participating gaming machines, the method including the steps of:

- selecting symbols resulting from play of the shared game event;
- storing the selected symbols in a symbol store arranged to store a plurality of symbols, the symbol store arranged such that once a maximum number of symbols is reached, storage of a further symbol in the symbol store results in the removal of a stored symbol from the symbol store in accordance with a removal rule; and
- determining whether the stored symbols meet an award criterion.

In an embodiment the symbol store is a First-In-First-Out (FIFO) symbol stack and the removal rule is that the first symbol added to the symbol stack is the first removed.

In an embodiment the shared game event includes playing a separate game on a display of each of the gaming machines and wherein the symbols are selected from the separate games. In an embodiment the symbols are selected at random from separate games. In an alternative embodiment only designated symbols appearing in the separate games are selected.

In an embodiment the symbols are stored in the same order as which they are selected.

In an embodiment the award criterion is that a particular combination of symbols appears in the symbol store. In an embodiment bonus credits and/or additional games are awarded to eligible gaming machines responsive to the award criterion being met.

In an embodiment the method includes the further step of waiting until the maximum number of symbols has been reached before determining whether the award criterion has been met.

In an embodiment a prize is awarded to at least one of the plurality of gaming devices when the award criterion has been met, according to a distribution rule. In an embodiment the distribution rule specifies a proportion of a total award to pay to gaming machines which contributed symbols toward the winning symbol combination.

According to a sixth aspect, the invention provides a computer program code which when executed by a processor implements the method according to the first or fifth aspects.

According to a seventh aspect, the present invention provides a computer readable medium including the program code of the sixth aspect.

According to an eighth aspect, the present invention provides a data signal including the program code of the sixth aspect.

BRIEF DESCRIPTION OF THE DRAWINGS

Features and advantages of the present invention will become apparent from the following description of certain embodiments thereof, by way of example only, with reference to the accompanying drawings, in which.

Figure 1:
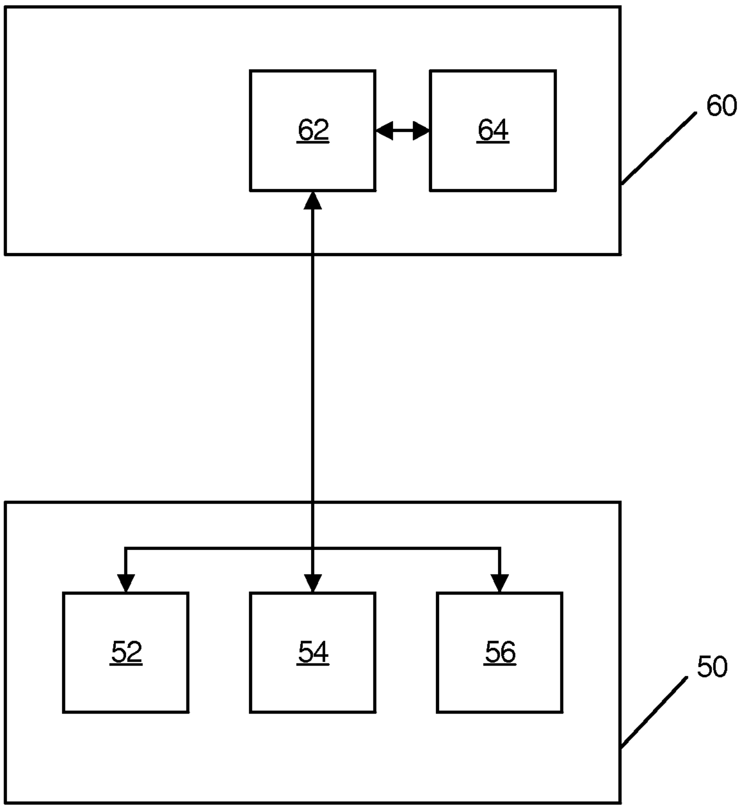
FIG. 1 is a schematic block diagram of core components of a gaming system, according to an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

In an embodiment a gaming system includes a game controller which is arranged to control play of a game and to award bonus prizes. The game controller includes a symbol store arranged to store a plurality of symbols. The symbol store is further arranged such that, once a maximum number of symbols is reached, storage of a further symbol results in the removal of a stored symbol in accordance with a removal rule. The game controller also includes a symbol selector module which is arranged to select symbols appearing in a game event for storing in the symbol store. For example, the symbols may be randomly selected from wins lines of a standard reel game. A determination module is also provided to determine whether the stored symbols meet an award criterion.

General Construction of a Gaming System

The gaming system can take a number of different forms. In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a “thick client” architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
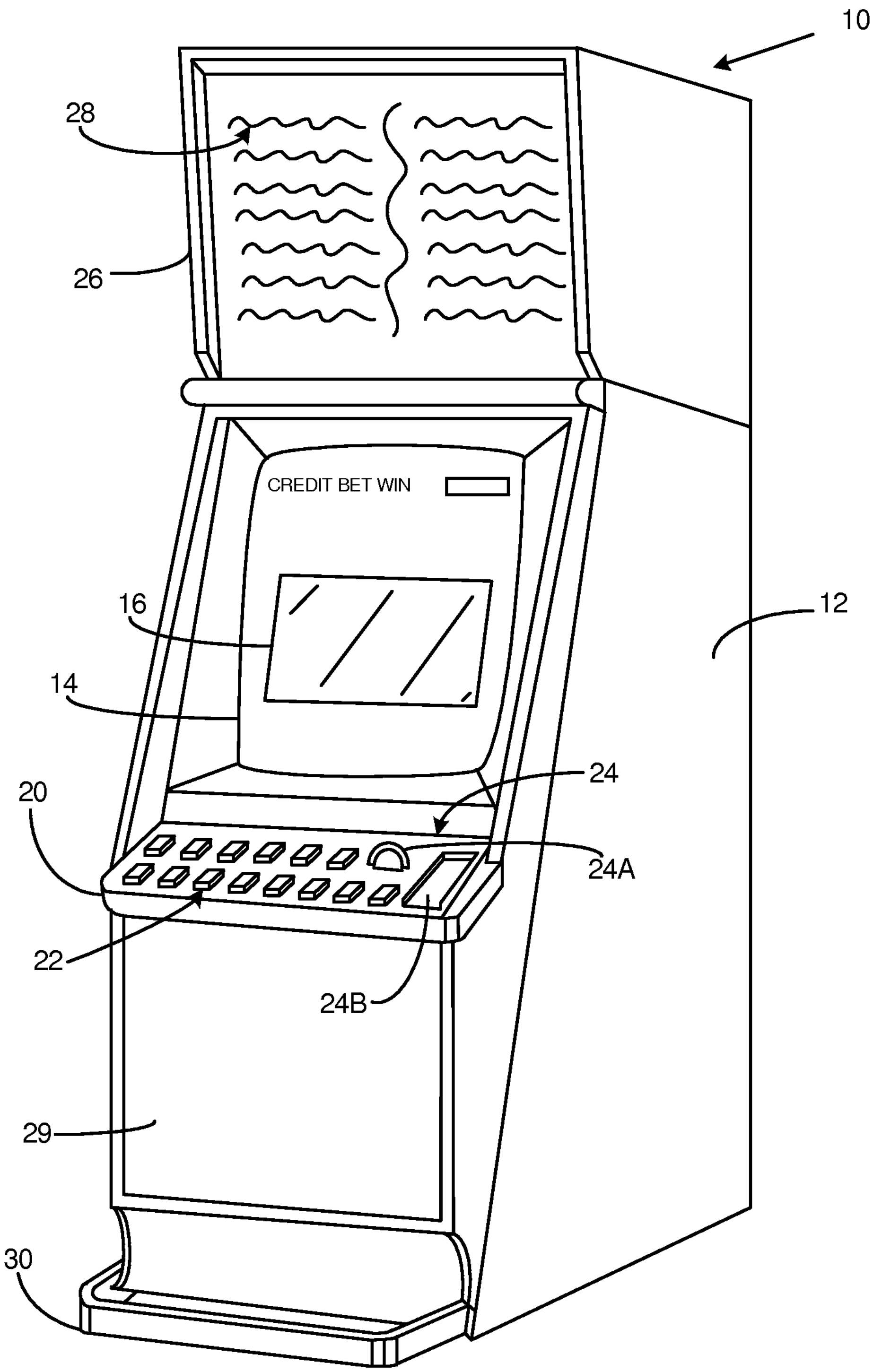
FIG. 2 is a perspective view of a gaming machine arranged to implement the gaming system of FIG. 1, according to an embodiment.

A gaming system in the form of a stand alone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module (not shown) having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
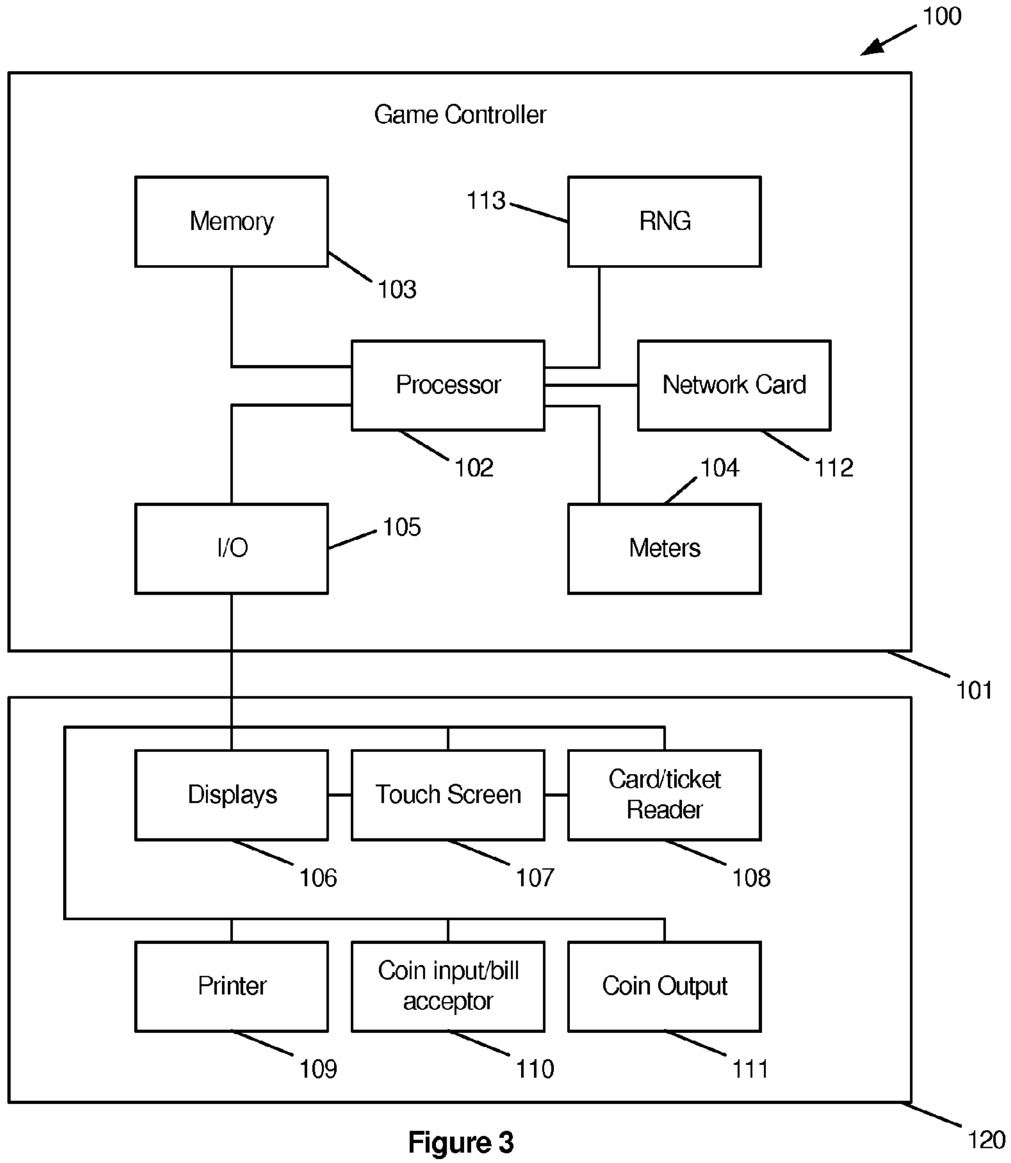
FIG. 3 is a schematic block diagram of operative components of the gaming machine shown in FIG. 2.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
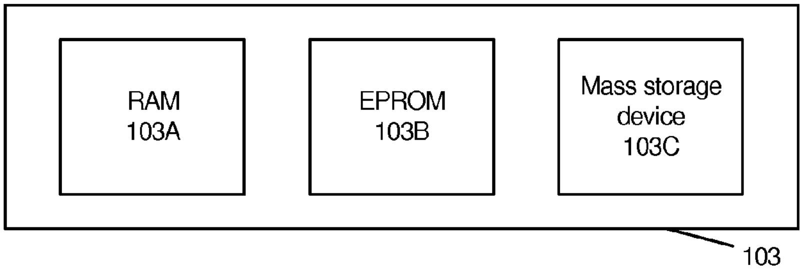
FIG. 4 is a schematic block diagram representing the structure of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
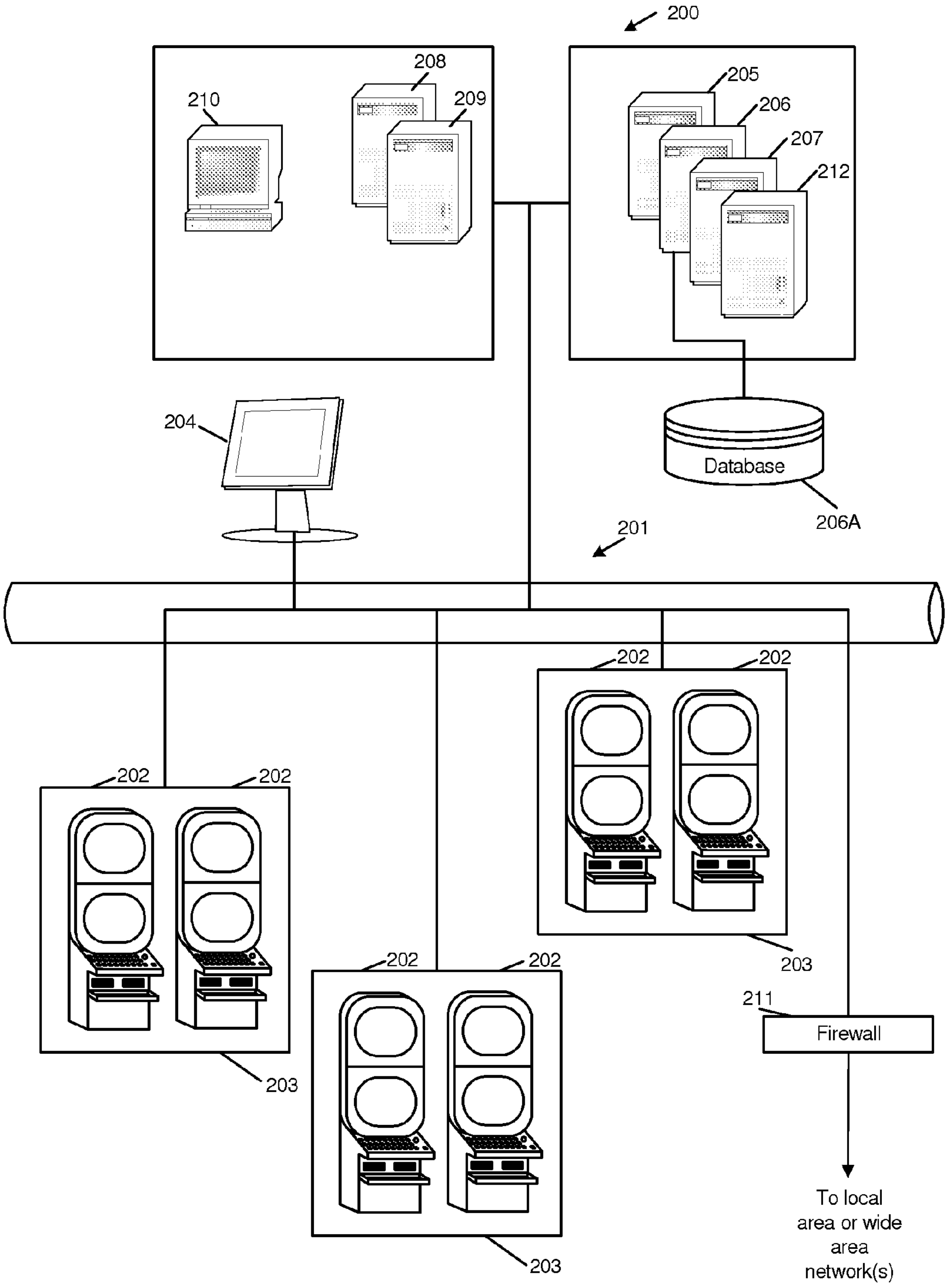
FIG. 5 is a schematic diagram of a networked gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games depending upon the terminals.

Persons skilled in the art will also appreciate that the method of embodiments could be embodied in program code. The program code could be supplied in a number of ways, for example on a computer readable medium, such as a disc or a memory (for example, that could replace part of memory 103) or as a data signal (for example, by downloading it from a server).

Embodiments may be implemented in relation to a spinning reel type game. Gaming systems for implementing games that involve a display of spinning reels as part of the display of the outcome of a game have either a video display or a mechanical display, these later machines most usually being "stepper" machines which have a separate motor for each reel. However, persons skilled in the art will appreciate that the invention can be implemented in respect if other forms of games, including; card games; ball draw games (e.g. bingo or keno); dice games; and pin and ball games.

In some implementations the game controllers of such gaming machines select symbols by employing a stop determining function that randomly determines the stop position for each reel. For example, if there are five reels, each having twenty symbols, the stop determining function might determine that the stop positions are positions: 3, 13, 7, 9 and 17. The spinning of the reels is then controlled so that each symbol comes to a stop in the same row, typically a predetermined row in a "window" visible to the player on the display that which corresponds to a player playing a single win line. When a reel stops, the symbols will be in one of a plurality of possible symbol positions for that reel relative to the stop position.

Further Detail of the Game Controller

Figure 6:
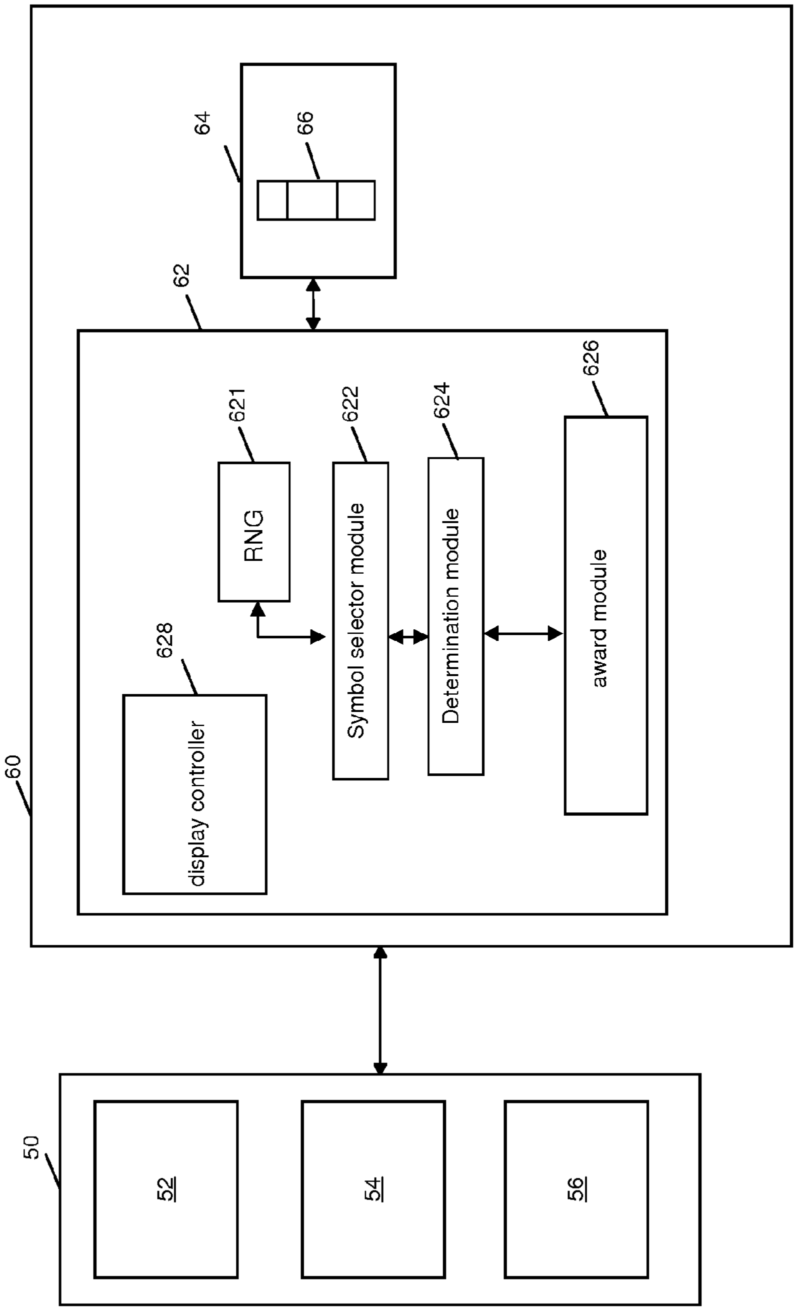
FIG. 6 is a schematic block diagram of a game controller.

The game controller 60 of an embodiment is shown in more detail in FIG. 6. For simplicity, only those modules needed to carry out embodiments of the invention are illustrated in FIG. 6. Other standard and/or non-standard modules may also be implemented for carrying out operation of normal and feature game play functionality.

Referring to FIG. 6, the game controller 60 includes a processor 62 which is arranged to control game play and carry out functions associated with awarding bonus prizes. It will be apparent that the processor 62 implements a number of modules, namely a random number generator module 621, symbol selector module 622, determination module 624, award module 626 and display controller module 628, based on program code stored in memory 64. A symbol store is 66 is also resident in memory 64.

In an embodiment the game controller 60 of the gaming machine is arranged to provide a game event in the form of a standard spinning reel game (hereafter "base game"). In the base game, a player selects how many win lines of a plurality of win lines they will play in each game—i.e. a minimum of one win line up to the maximum number of win lines allowed by the game. Persons, skilled in the art, will appreciate that in other embodiments, the player may select a number of reels to play. Each win line is formed by a set of symbol positions consisting of one symbol position from each reel. That is, a predetermined symbol position of each reel is assigned to a win line. The symbol positions that constitute each of the win lines are usually advertised to the player by markings on the display or diagrams showing the symbol positions that correspond to each win line. Some of the win lines will be horizontal or diagonal lines. Typically, the win lines will be constituted by symbol positions in the visible window. A game outcome is determined based on the symbols on the win lines and a prize table that specifies awards.

The symbol selector module 622 selects the symbols to appear in the base game based on symbol data which specifies the symbols. The symbols to appear in the base game are selected by the symbol selector using the random number generator 621. In the normal course of game play, the selected symbols are displayed on the display 54 in the various symbol stop positions.

According to an embodiment, the symbol selector module 622 is further arranged to select symbols appearing in the various symbol stop positions for storing in the symbol store. The symbol store is arranged such that, once the symbol store is full (i.e. a maximum number of symbols is reached), the storage of a further symbol results in the removal of a stored symbol in accordance with a removal rule.

In the embodiment described herein, the symbol store is in the form of a First-In-First-Out (FIFO) symbol stack 66 implementing a FIFO queue structure. As will be appreciated by persons skilled in the art, in a FIFO queue structure, the first data to be added to the queue (i.e. the first symbol selected by the symbol selector module 622) will also be the first data (symbol) to be removed, once the FIFO symbol stack 66 has reached the predetermined capacity. Further processing of the queue structure proceeds sequentially in the same order. In other words, the removal rule for the symbol stack 66 is that the first symbol to enter the stack is also the first symbol which is removed from the stack. According to the embodiment described herein, the symbol stack 66 is arranged to store three symbols at any one time. That is, the stack 66 has a symbol capacity of three. However, it is noted that the capacity of the symbol stack 66 may be increased or decreased, depending on the specific implementation and may even vary during game play, for example based on a player bet amount or a game event.

As described above, the symbol selector module 622 is arranged to select symbols appearing in the base game for storing in the symbol stack 66. Depending on the embodiment, the symbol selector module 622 may always be active, or only active if an eligibility criterion is met, such as a designated turnover or placement of an additional bet. According to the embodiment described herein, the selector module 622 randomly selects one symbol from each game of the base game. For example, in one game, the selected symbol might be taken from the symbol stop position corresponding to the second row of the first reel, while the next selected symbol might be selected from the symbol stop position corresponding to the last row of the third reel, and so on. Alternatively, the selected symbol might always be selected from the same symbol stop position (e.g. reel one, row one).

A determination module 624 determines whether symbols stored in the FIFO symbol stack 66 meet an award criterion. In one embodiment the award criterion is that a particular combination of symbols is present in the symbol stack 66. The particular combinations which meet the predetermined award criterion may be identical to those which constitute an award in the reel game. For example, the presence of three of the same kind of symbol may constitute an award. Alternatively, the award criterion may be that a specified symbol, or bonus symbol, is present within the symbol stack 66.

Responsive to determining that the stored symbols meet a predetermined award criterion, the award module 626 awards a player of the gaming machine 10 with a prize. In an embodiment, the prize includes bonus credits determined from a prize table that specifies awards. Alternatively, the prize may be the awarding of bonus or feature games. The number of bonus games may, for example, depend on the particular combination of symbols present in the symbol stack 66. However, it is noted that the actual form of prize awarded may vary depending on the particular implementation.

Figure 7:
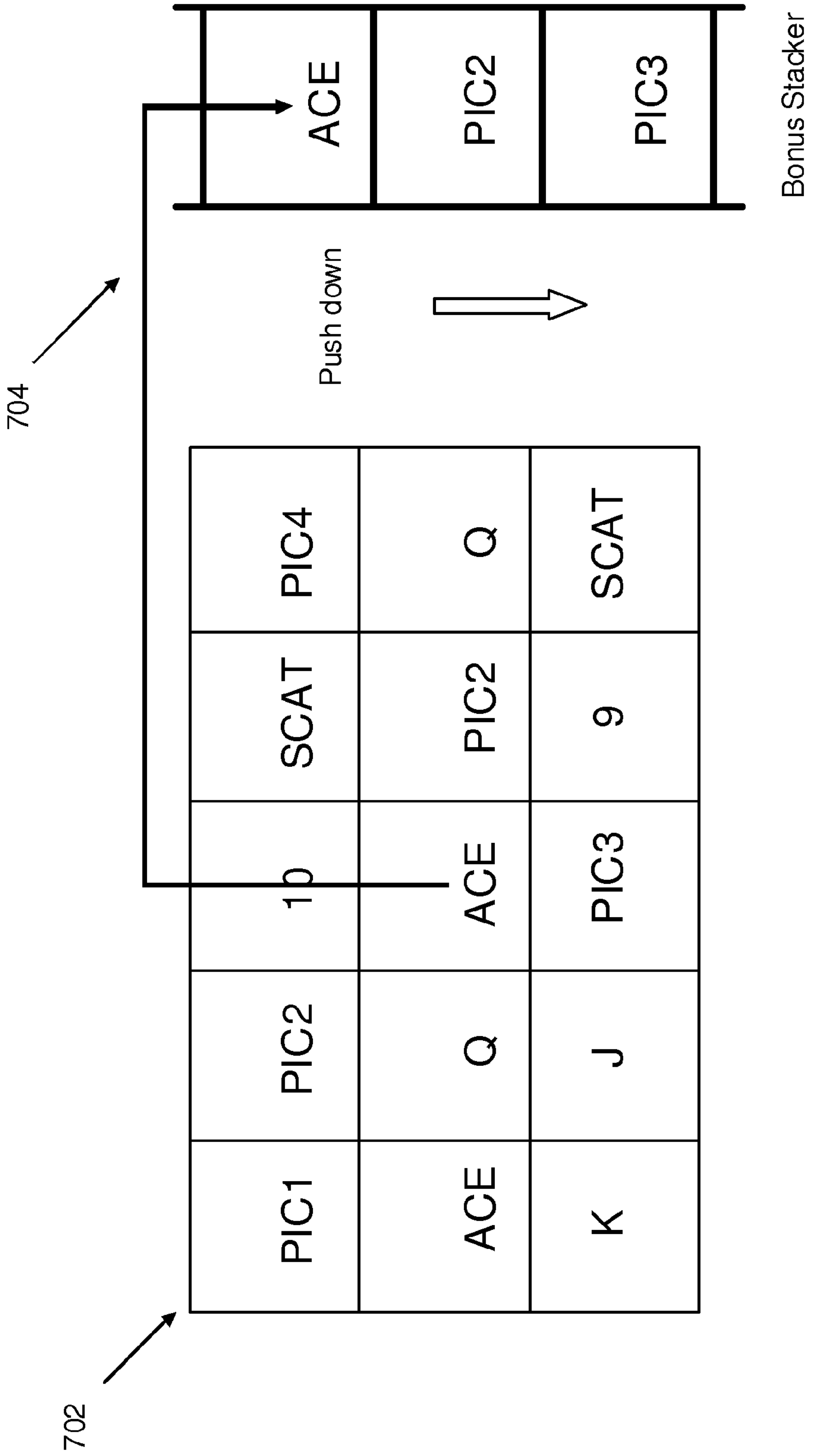
FIG. 7 is a representation of an example symbol stack displayed in association with a base game generated by a gaming system, in accordance with an embodiment of the present invention.

A representation of the symbol stack 66 and symbols temporarily stored therein, can be displayed by the display controller module 628 in association with the base game (as shown in FIG. 7). In an embodiment, the opportunity to store symbols in the FIFO symbol stack 66 will only be available after a special event criterion has been met. For example, the special event criterion may be that a particular combination of symbols is present on a win line of the base game, or alternatively some other form of trigger commonly used in the art to initiate a special event. In such an embodiment, the FIFO symbol stack 66 will only be displayed by the display controller module 628 after the special event criterion has been met.

FIG. 7 is an example screen shot 700 output by the display controller module 628 of the gaming controller 60, in accordance with an embodiment of the present invention. In FIG. 7, the base game window is denoted by reference numeral 702, while the symbol store 66 is denoted by reference numeral 704.

Figure 8:
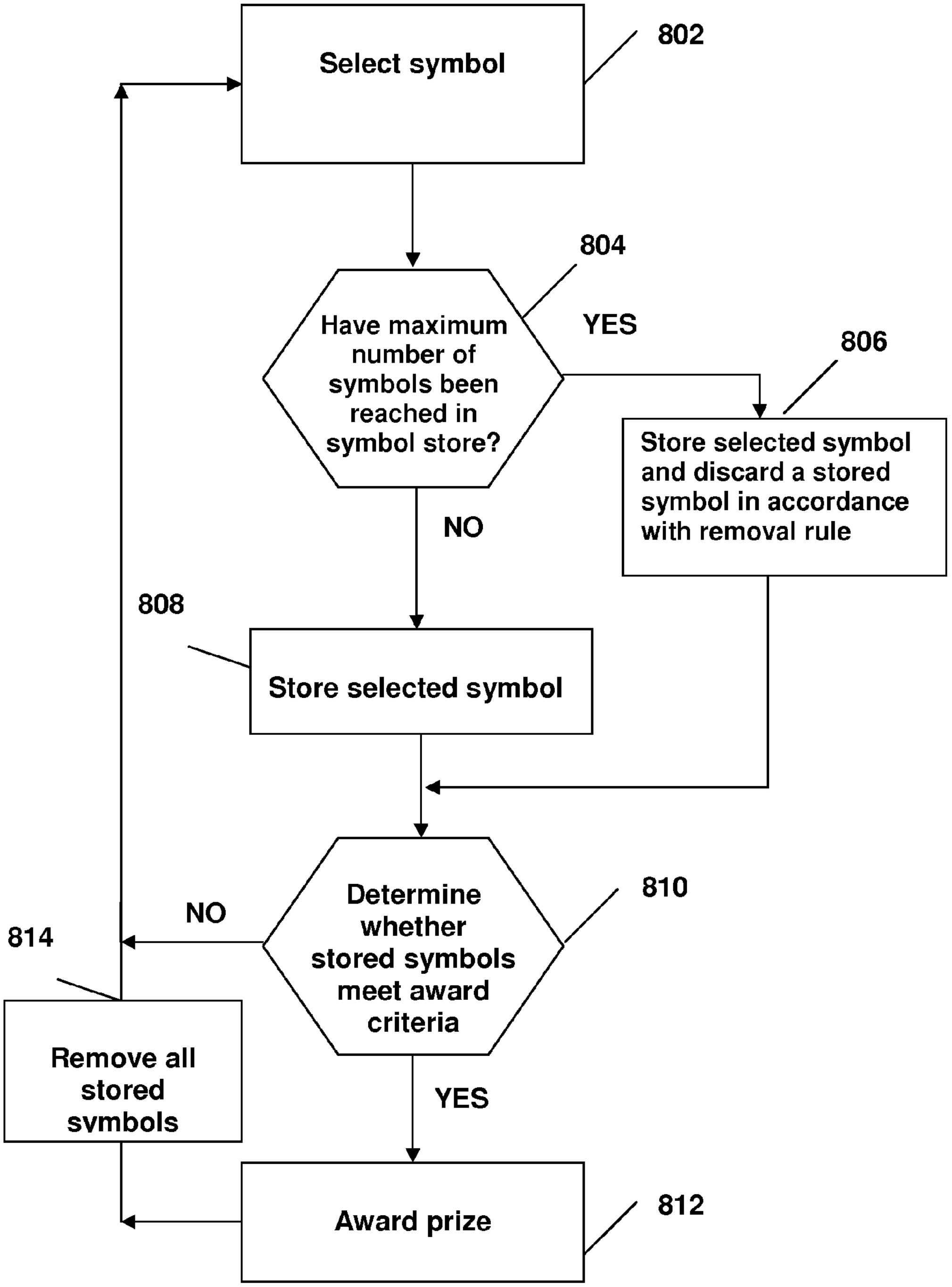
FIG. 8 is a flow diagram illustrating operation of a gaming system in accordance with an embodiment of the present invention.

Operation of the illustrated embodiment will now be described with additional reference to the flow diagram 800 of FIG. 8. At step 802, the symbol selector module 622 selects a symbol appearing in the game event (i.e. base game) for storing in the symbol store 66. According to the depicted embodiment, a "PIC 3" symbol was selected from a first game of the base game; a "PIC2" symbol from a second game; and an "ACE" symbol from a third game. As shown, the last symbol selected by the symbol selector module 622 was taken from middle position of the third reel of the base game window 702. At step 804, a determination is made as to whether the maximum number of symbols has been reached by the symbol store 66. If the maximum number has not been reached, the selected symbol is stored in the symbol store 66 (step 808) and, at step 810, a determination is made as to whether the stored symbols meet an award criterion. Alternatively, if at step 804 it is determined that the maximum number of symbols has been reached, then a stored symbol is discarded according to a removal rule and the selected symbol stored. For example, in the illustrated embodiment, the removal rule is a FIFO rule and therefore the "PIC3" symbol will be removed from the store 66. Following step 806, a determination is made as per step 810 described above. If, at step 810, it is determined that the award criterion has been met, the award module 628 awards a prize and the process returns to step 802. Optionally, all stored symbols may be removed from the store after awarding the prize (step 812). If, at step 810, it is determined that the award criterion has not been met (as is the case in the illustrated example, whereby the combination of an "ACE", "PIC2" and "PIC3" symbol does not constitute an award), the process returns to step 802.

In an alternative embodiment to that described above, the symbol store may not implement a FIFO queue. In such an embodiment, once the maximum number of symbols has been reached, symbols are removed according to alternative removal rule. For example, the symbol with the lowest value may be removed, to thereby allow a player to build towards a bigger win. In another embodiment, the symbol to be removed may be specified by the player. Other removal rules may be specified by the game controller depending on the particular implementation.

In yet a further alternative embodiment, the symbol store may be arranged to store symbols accumulated from multiple gaming machines 10 participating in a shared game event. The shared game event may, for example, be a tournament feature game triggered by one of the individual gaming machines 10 during play of a base game. The tournament game may be triggered in accordance with any suitable triggering technique, such as a symbol based trigger, mystery trigger, etc. In an embodiment, the tournament feature game may involve displaying a set of dedicated reel strips on the individual displays 14 under the control of a server module, as will be described in more detail below. During the tournament, the machines 10 are in free play mode—the reels spun under control of the server module without any player input or bet.

Symbols may be selected from individual games being played-out by each of the gaming machines 10 for storing in the symbol store. The symbols may be selected in a random fashion, or according to some specified rule. For example, only designated symbols appearing in each of the individual games may be selected for storing in the symbol store.

In an embodiment the controller includes an award module arranged to award a prize to at least one of the plurality of gaming devices when the award criterion has been met, according to a distribution rule. In an embodiment the distribution rule specifies a proportion of a total award to pay to gaming machines which contributed symbols toward the winning symbol combination. It will be appreciated, however, that alternative awarding techniques may equally be applicable depending on the desired implementation. In an embodiment the total prize pool is made of up contributions from the individual gaming machines in accordance with techniques known in the art (e.g. allocating a percentage of each bet made during play of a standard game for contribution towards a jackpot prize pool).

To carry out the aforementioned functionality, the system may implement a client-server architecture. For example, each of the gaming machines 10 participating in the shared game event may include a client module including the necessary game controller modules for displaying the individual games. The server module may be a dedicated network module, or alternatively be incorporated into another network element such as the jackpot server (see FIG. 2). The server module is adapted to implement the necessary game controller modules for storing selected symbols and awarding prizes, as previously described with reference to FIG. 6.

In an alternative architecture, one of the gaming machines may be programmed to implement both a server and client game controller module (thus avoiding the need to have a dedicated server module). The server module is adapted to communicate with the client modules of the other participating gaming machines 10 via input/output ports as shown in FIG. 1.

In the above described embodiments, a player's interest in the game may be heightened by providing further opportunities to be awarded a prize through the implementation of a bonus symbol store. Further, by allowing symbols to be removed from the store according to a removal rule, the symbols present within the stack are ever changing, thereby adding to the dynamic nature of the system and as a result, the enjoyment to the player.

Persons skilled in the art will appreciate that the method of the embodiment could be implemented in program code. The program code could be supplied in a number of ways, for example on a computer readable medium, such as a disc or a memory (for example, that could replace part of the memory 103) or as a data signal (for example, by downloading it from a server). The program code could be executed by more than one processing unit. For example, partly by the server module and partly by the client (and accordingly spread between a number of different locations).

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It is to be understood that, if any prior art publication is referred to herein, such reference does not constitute an admission that the publication forms a part of the common general knowledge in the art, in Australia or any other country.

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A computer-implemented method of conducting a shared game event including two or more participating gaming devices, the method comprising:

selecting, based on an eligibility criterion, symbols resulting from play of the shared game event; wherein the eligibility criterion comprises at least one of a designated turnover or a placement of an additional bet;

storing the selected symbols in a symbol store arranged to store a plurality of symbols, the symbol store arranged such that once a maximum number of symbols is reached, storage of a further symbol in the symbol store results in the removal of a stored symbol from the symbol store in accordance with a removal rule; and determining whether the stored symbols meet an award criterion.

2. A method as claimed in claim 1, wherein the symbol store is a First-In-First-Out (FIFO) symbol stack and the removal rule is that the first symbol added to the symbol stack is the first removed.

3. A method of gaming as claimed in claim 1, wherein the symbols are selected at random from at least one of a base game and feature game.

4. A method of gaming as claimed in claim 3, wherein at least one symbol is selected from each game of the base game and/or feature game.

5. A method of gaming as claimed in claim 3, wherein the symbols are stored in the same order as which they are selected.

6. A method of gaming as claimed in claim 1, wherein the award criterion is that a particular combination of symbols appears in the symbol store.

7. A method of gaming as claimed in claim 1, wherein bonus credits and/or additional games are awarded responsive to the award criterion being met.

8. A method of gaming as claimed in claim 1, further comprising waiting until the maximum number of symbols has been reached before determining whether the award criterion has been met.

9. A method of gaming as claimed in claim 2, further comprising displaying the symbol store in association with the base game and/or feature game.

10. A method of gaming as claimed in claim 1, wherein the symbols are selected from a plurality of symbols utilised in the game event for evaluating a winning outcome.

11. A controller for a gaming system including two or more participating gaming devices operable to participate in a shared game event, the controller comprising:

a symbol store arranged to store a plurality of symbols, the symbol store arranged such that once a maximum number of symbols is reached, storage of a further symbol results in a removal of a storage symbol in accordance with the removable symbol;

a symbol selector module arranged to select symbols resulting from play of the shared game event and to store the selected symbols in the symbol store, the symbol selector module activated to select symbols based on an eligibility criterion, wherein the eligibility criterion comprises at least one of a designated turnover or a placement of an additional bet; and a determination module arranged to determine whether the stored symbols meet an award criterion.

12. A game controller as claimed in claim 11, wherein the symbol store is a First-In-First-Out (FIFO) symbol stack and the removal rule is that the first symbol added to the symbol stack is the first removed.

13. A game controller as claimed in claim 11, wherein the symbols are selected at random from at least one of a base game and feature game.

14. A game controller as claimed in claim 13, wherein at least one symbol is selected from each game of the base game and/or feature game.

15. A game controller as claimed in claim 11, further comprising an award module arranged to award a prize when the award criterion has been met.

16. A game controller as claimed in claim 11, wherein the award module is arranged to award bonus credits and/or additional games responsive to the award criterion being met.

17. A game controller as claimed in claim 11, wherein the award criterion is that a particular combination of symbols appears in the symbol store.

18. A game controller as claimed in claim 11, wherein the determination module is arranged to wait until the maximum number of symbols has been reached before making the determination.

19. A game controller as claimed in claim 13, further comprising a display module arranged to display the symbol store in association with the base game and/or feature game.

20. A game controller as claimed in claim 11, wherein the game controller is constituted by a processor executing program code stored in a memory.

21. A controller in accordance with claim 11, wherein the shared game event comprises displaying a separate game on a display of each of the participating gaming devices and wherein the symbols are selected from the separate games.

22. A controller in accordance with claim 11, wherein the gaming system is arranged to conduct the shared game event in response to a trigger event occurring in relation to play of a game on one of the gaming devices.

23. A controller in accordance with claim 11, wherein the award criterion is that a particular symbol combination appears in the symbol store.

24. A controller in accordance with claim 11, further comprising an award module arranged to award a prize to at least one of the plurality of gaming devices in the gaming system when the award criterion has been met, according to a distribution rule.

25. A tangible computer readable storage medium including computer program code which when executed by a processor implements a method of conducting a shared game event including two or more participating gaming devices, the method comprising:

selecting, based on an eligibility criterion, symbols appearing in a game event wherein the eligibility criterion comprises at least one of a designated turnover or a placement of an additional bet;

storing selected symbols appearing in a game event in a symbol store arranged to store a plurality of symbols, the symbol store arranged such that, once a maximum number of symbols is reached, storage of a further symbol in the symbol store results in the removal of a stored symbol from the symbol store in accordance with a removal rule; and determining whether the stored symbols meet an award criterion.

* * * * *